United States Patent
Barkley et al.

(10) Patent No.: US 9,757,955 B2
(45) Date of Patent: Sep. 12, 2017

(54) IMAGING APPARATUS AND METHOD OF USING COLORANT DENSITY FOR REDUCING PRINTING DEFECTS

(71) Applicant: FUNAI ELECTRIC CO., LTD., Osaka (JP)

(72) Inventors: Lucas D. Barkley, Lexington, KY (US); Michael A Marra, III, Lexington, KY (US); Bruce A. Deboard, Georgetown, KY (US); Yu Ito, Daito (JP)

(73) Assignee: FUNAI ELECTRIC CO., LTD. (JP)

( * ) Notice: Subject to any disclaimer, the term of this patent is extended or adjusted under 35 U.S.C. 154(b) by 0 days.

(21) Appl. No.: 14/963,581

(22) Filed: Dec. 9, 2015

(65) Prior Publication Data

US 2017/0165990 A1    Jun. 15, 2017

(51) Int. Cl.
*B41J 2/21*    (2006.01)

(52) U.S. Cl.
CPC ............... *B41J 2/2132* (2013.01); *B41J 2/21* (2013.01)

(58) Field of Classification Search
CPC .................................. B41J 2/2132; B41J 2/21
See application file for complete search history.

(56) References Cited

U.S. PATENT DOCUMENTS

| | | | |
|---|---|---|---|
| 5,417,990 A * | 5/1995 | Soedjak | A23J 3/04 426/103 |
| 5,489,926 A | 2/1996 | Arbeiter | |
| 5,714,990 A | 2/1998 | Courtney | |
| 5,751,312 A * | 5/1998 | Gibson | B41J 2/2132 347/15 |
| 6,012,792 A * | 1/2000 | Sievert | B41J 2/21 347/12 |
| 6,033,137 A | 3/2000 | Ito | |
| 6,142,604 A | 11/2000 | Kanda et al. | |
| 6,145,959 A * | 11/2000 | Lund | B41J 2/04515 347/14 |
| 6,452,618 B1 * | 9/2002 | Heim | B41J 2/04515 347/140 |
| 8,770,706 B1 | 7/2014 | Writt et al. | |
| 2006/0146090 A1 * | 7/2006 | Fellingham | B41J 2/2132 347/41 |

* cited by examiner

*Primary Examiner* — Justin Seo
(74) *Attorney, Agent, or Firm* — Aust IP Law

(57) ABSTRACT

A method for reducing printing defects in inkjet printing includes determining a respective colorant density for each colorant of a plurality of colorants for a region to be printed; determining a colorant dry-time signal strength as a function of a combined colorant density value based on the respective colorant densities of the plurality of colorants for the region to be printed; determining a respective colorant swath contraction strength for each colorant as a function of the respective colorant density; selecting a dry-time threshold which if met by the colorant dry-time signal strength indicates that a dry-time defect may occur; selecting a respective colorant density threshold for each colorant which if met by the respective colorant density indicates a visible swath contraction may occur; and determining a printing action to be taken based on whether the dry-time threshold is met and whether at least one respective colorant density threshold is met.

20 Claims, 8 Drawing Sheets

IMAGING APPARATUS AND METHOD OF USING COLORANT DENSITY FOR REDUCING PRINTING DEFECTS

CROSS-REFERENCE TO RELATED APPLICATIONS

None.

BACKGROUND OF THE INVENTION

1. Field of the Invention

The present invention relates to banding in inkjet printing, and, more particularly, to an imaging apparatus and method of using colorant density for reducing printing defects in inkjet printing.

2. Description of the Related Art

An inkjet print engine of an inkjet printer or multifunction imaging device forms an image on a print media sheet by horizontally scanning one or more inkjet printheads across the print media sheet in multiple printing passes, also referred to as printing swaths, and by indexing the print media sheet in an orthogonal direction, e.g., a vertical direction, between printing passes. Such inkjet print engines are capable of printing in multiple printing modes, e.g., draft, high quality, photo, etc.

In accordance with the present invention, it has been observed that the printing defects of dry-time banding and swath contraction are a function of colorant density on the printed page. Dry-time banding is a defect that is produced in multi-pass printing where the ink from the previous print swath applied during a previous printing pass is in a transient drying state and is contacted by ink of a next print swath applied during a next printing pass. For example, if the previous print swath was applied in a left-to-right printing pass, the beginning (left) portion of the print swat is more dry than the end (right) portion of the print swath. On the next printing pass, typically in an opposite direction, right-to-left, the beginning portion of this next print swat is applied on the wettest portion of the previous print swath, and the end portion of this next print swath is applied to the driest portion of the previous print swath. This act of printing new ink on wet ink in multiple printing passes tends to cause dry-time banding when the printing densities of the respective print swaths are high enough and in the right combination of colorants.

Swath contraction occurs when the population of the jetting nozzles in an individual inkjet array is high enough to produce an airflow wherein ink droplets near the vertically opposed ends of the inkjet array are pulled inwardly in parallel to the inkjet array. This produces an effectively shorter print swath height, i.e., in the vertical direction, which leaves white or lighter space showing at the print swath boundaries.

What is needed in the art is an imaging apparatus and method that reduces printing defects associated with dry-time banding, and swath contraction.

SUMMARY OF THE INVENTION

In accordance with the present invention, printing defects associated with dry-time banding and swath contraction are reduced by considering the likelihood of each defect as a function of the density of all colorants used in the system, and systematically changing how the ink is applied, e.g., on a per printing pass basis, to reduce each particular defect. Advantageously, the present invention only slows printing when necessary to avoid unacceptable levels of dry-time banding and swath contraction.

The invention, in one form, is directed to a method for reducing printing defects in inkjet printing, including determining a respective colorant density for each colorant of a plurality of colorants for a region to be printed; determining a colorant dry-time signal strength as a function of a combined colorant density value based on the respective colorant densities of the plurality of colorants for the region to be printed; determining a respective colorant swath contraction strength for each colorant as a function of the respective colorant density; selecting a dry-time threshold which if met by the colorant dry-time signal strength indicates that a dry-time defect is likely to occur; selecting a respective colorant density threshold for each colorant which if met by the respective colorant density indicates a visible swath contraction is likely to occur; and determining a printing action to be taken based on whether the dry-time threshold is met and whether at least one respective colorant density threshold is met.

The invention, in another form, is directed to a method for reducing printing defects in inkjet printing, including setting a dry-time threshold as a combined CMYK colorant density value, which if met indicates that a dry-time defect is likely to occur; setting a black (K) density threshold representing a black (K) ink drop density, which if met indicates that a visible swath contraction is likely to occur; determining a colorant dry-time signal strength as a function of a cyan (C) ink drop density, a magenta (M) ink drop density, a yellow (Y) ink drop density, and a black (K) ink drop density, wherein each ink drop density for a respective colorant is based on image data for a print swath to be printed; determining a black (K) swath contraction strength as a function of the black (K) ink drop density; and selecting a predetermined printing action for the image data for each of four possible scenarios of colorant dry-time signal strength and black (K) swath contraction strength relating to the dry-time threshold and the black (K) density threshold.

The invention, in another form, is directed to a method for reducing printing defects in inkjet printing including determining a cyan (C) ink drop density for a region to be printed; determining a magenta (M) ink drop density for the region to be printed; determining a yellow (Y) ink drop density for the region to be printed; determining a black (K) ink drop density for the region to be printed; determining a colorant dry-time signal strength as a function of the cyan (C) ink drop density, the magenta (M) ink drop density, the yellow (Y) ink drop density, and the black (K) ink drop density; selecting a dry-time threshold as a combined CMYK colorant density value, which if met indicates that a dry-time defect is likely to occur; determining a cyan (C) swath contraction strength as a function of the cyan (C) ink drop density; determining a magenta (M) swath contraction strength as a function of the magenta (M) ink drop density; determining a yellow (Y) swath contraction strength as a function of the yellow (Y) ink drop density; determining a black (K) swath contraction strength as a function of the black (K) ink drop density; selecting a cyan (C) density threshold representing a cyan (C) ink drop density, which if met indicates that a visible swath contraction is likely to occur; selecting a magenta (M) density threshold representing a magenta (M) ink drop density, which if met indicates that a visible swath contraction is likely to occur; selecting a yellow (Y) density threshold representing a yellow (Y) ink drop density, which if met indicates that a visible swath contraction is likely to occur; selecting a black (K) density threshold representing a black (K) ink drop density, which if met indicates that a visible swath contraction is likely to occur; if the dry-time signal strength meets the dry-time threshold, then tentatively perform a CMY printing pass in a first direction, followed by a non-printing return pass in a second direction opposite to the first direction, followed by a K printing pass in the first direction; if the black (K) swath contraction strength meets the black (K) density threshold, then splitting the K printing pass into a first K printing pass in the first direction and a second K printing pass in the first direction with a non-printing return pass between the first K printing pass and the second K printing pass; and if the cyan (C) swath contraction strength meets the cyan (C) density threshold, or if the magenta (M) swath contraction strength meets the magenta (M) density threshold, or if the yellow (Y) swath contraction strength meets the yellow (Y) density threshold, then splitting the CMY printing pass into a first CMY printing pass in the first direction and a second CMY printing pass in the first direction with a non-printing return pass between the first CMY printing pass and the second CMY printing pass.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
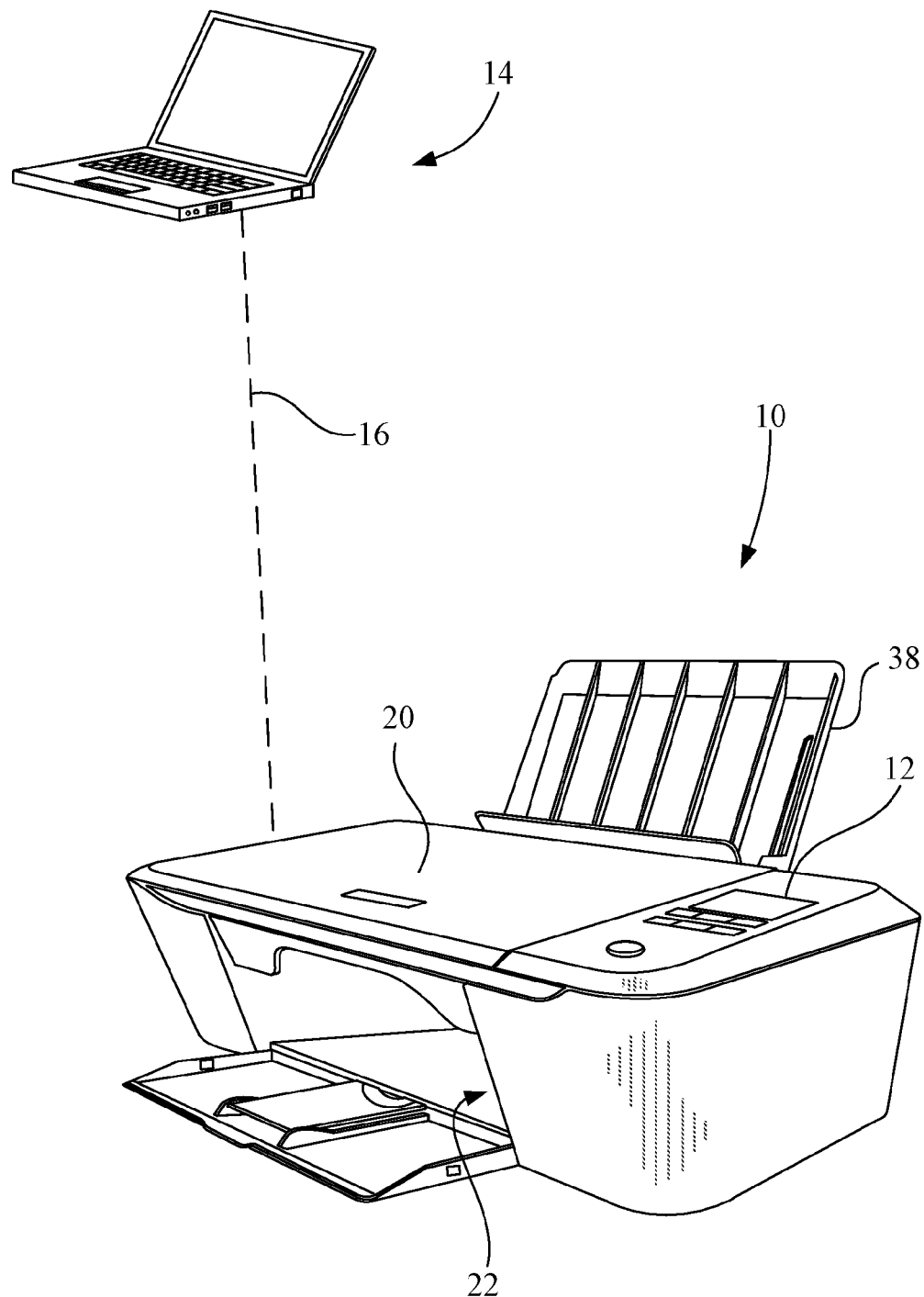
FIG. 1 is a perspective view of an imaging system that includes an imaging apparatus configured in accordance with the present invention.

Referring now to the drawings, and more particularly to FIG. 1, there is shown a multifunction imaging apparatus 10, which includes scanning, copying, inkjet printing and faxing functionality. Imaging apparatus 10 includes a user interface 12, and may be operated as a standalone device. User interface 12 may be, for example, a touch screen display having a touch surface to facilitate user input, and a display to provide visual information to the user.

Alternatively, imaging apparatus 10 may be communicatively coupled to a host device 14, such as a personal computer, tablet, cell phone, or other such electronic data processing device. Communications between imaging apparatus 10 and host device 14 may be facilitated by a communications link 16. Communications link 16 may be in the form of a wireless connection, such as Bluetooth or IEEE 802.11, or a wired connection, such as USB or Ethernet. Imaging apparatus 10 is interfaced with host device 14 via communications link 16 in order to transmit and/or receive data for use in carrying out printing, scanning, and faxing functions associated with imaging apparatus 10.

Figure 2:
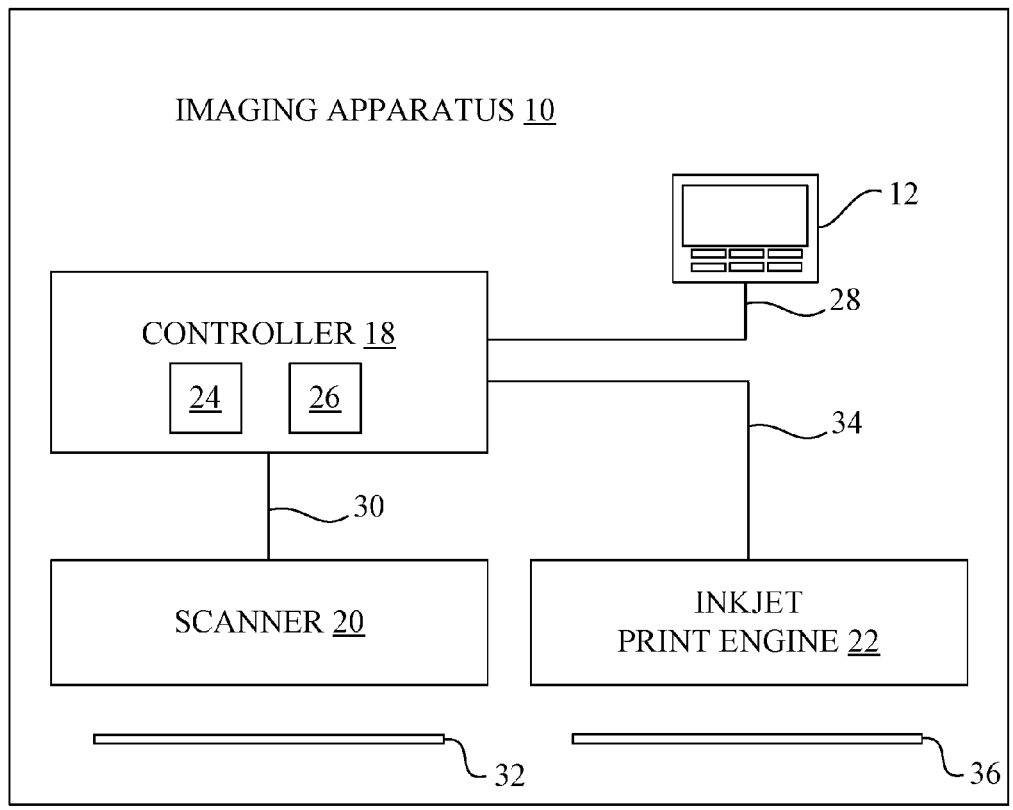
FIG. 2 is a block diagram depicting the major components of the imaging apparatus of FIG. 1.

Referring now also to FIG. 2, there is shown a diagrammatic depiction of imaging apparatus 10. In the present embodiment, imaging apparatus 10 includes a controller 18, a scanner 20, and an inkjet print engine 22.

Controller 18 includes a processor circuit 24 and a memory circuit 26, and may be formed as one or more Application Specific Integrated Circuits (ASIC). Processor circuit 24 of controller 18 may be configured via software and/or firmware to operate as a printer controller and/or a scanner controller for performing printing and scanning functions. Although controller 18 is depicted as residing in imaging apparatus 10, in embodiments that include host device 14, a portion of controller 18 may reside in host device 14.

Controller 18, and more particularly processor circuit 24, is communicatively coupled to user interface 12 via communications link 28, e.g., by wired connections. Processor circuit 24 has one or more programmable microprocessors and associated circuitry, such as an input/output interface, clock, buffers, memory, etc. Memory circuit 26 is communicatively coupled to processor circuit 24, e.g., via a bus circuit, and may include volatile memory circuits, such as random access memory (RAM), and non-volatile memory circuits, such as read only memory (ROM), electronically erasable programmable ROM (EEPROM), NOR flash memory, NAND flash memory, etc.

Controller 18 is electrically connected and communicatively coupled to scanner 20 via a communications link 30. Controller 18 executes program instructions to operate scanner 20 during a scanning operation, such as electronic scanning, copying or faxing operations, to convert a printed image formed on a print media substrate 32, such as a sheet of paper, into digital data representative of the printed image. Scanner 20 may be, for example, a flatbed scanner. Scanner 20 may be a color scanner having three data channels, e.g., RGB (red, green, blue), the operation of which is well known in the art.

Controller 18 is electrically connected and communicatively coupled to inkjet print engine 22 via a communications link 34, such as for example, one or more multi-conductor interface cables. Controller 18 executes program instructions to process print commands, to process image data (e.g., by performing data formatting, half-toning, etc.), and to operate inkjet print engine 22 during a printing operation, to form a printed image on a print media sheet 36. Print media sheet 36 may be, for example, plain paper, coated paper, photo paper and transparency media. It is to be understood that the printing operation may also include the printing aspects of a copying operation.

Figure 3:
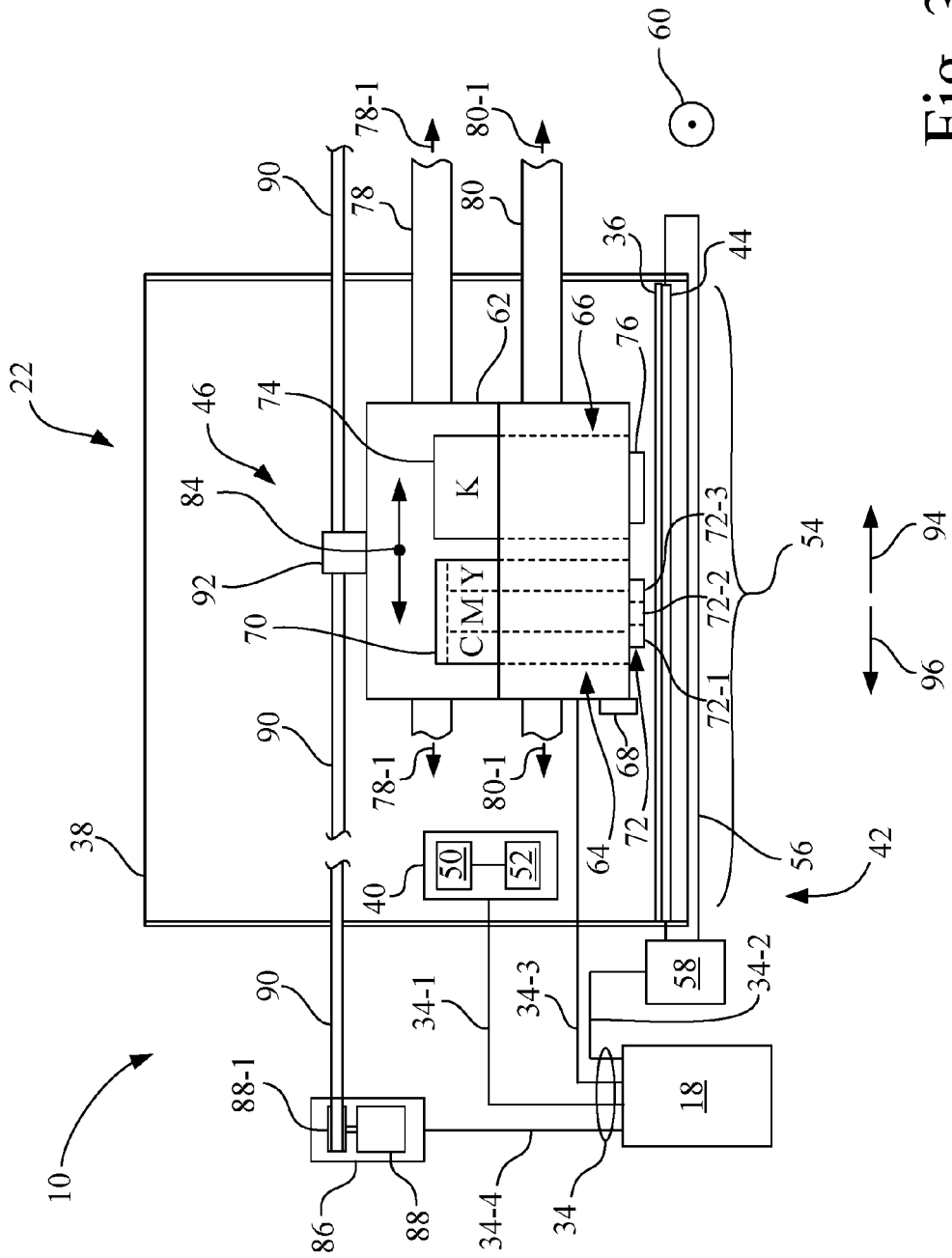
FIG. 3 is a depiction of the inkjet print engine of the imaging apparatus of FIG. 2.

Referring also to FIG. 3, inkjet print engine 22 includes a media source 38, a sheet picking unit 40, a feed roller unit 42, a sheet support mid-frame 44, and a printhead carrier system 46. Controller 18 is electrically connected and communicatively coupled to each of sheet picking unit 40, feed roller unit 42, and printhead carrier system 46 via communications link 34.

Media source 38 is configured, e.g., as a vertically oriented tray, to receive a plurality of print media sheets from which a print medium, e.g., a print media sheet 36, is picked by sheet picking unit 40. Sheet picking unit 40 includes a motor 50 rotatably coupled to a pick roller 52, and motor 50 is communicatively coupled to controller 18 via an interface cable 34-1 of communications link 34. Interface cable 34-1 may be, for example, a multiple-wire electrical conductor. Pick roller 52 rotatably engages print media sheet 36, and in turn transports print media sheet 36 to feed roller unit 42, which in turn further transports print media sheet 36 during a printing operation to mid-frame 44.

Mid-frame 44 provides support for the print media sheet 36 when the print media sheet 36 is in a print zone 54, wherein print zone 54 defines, in part, a portion of a print media path of inkjet print engine 22.

Feed roller unit 42 includes a feed roller 56 and corresponding index pinch rollers (not shown). Feed roller 56 is rotatably driven by a drive unit 58. Controller 18 is electrically connected and communicatively coupled to drive unit 58 via an interface cable 34-2 of communications link 34. Interface cable 34-2 may be, for example, a multiple-wire electrical conductor. The index pinch rollers apply a biasing force to hold the print media sheet 36 in contact with respective driven feed roller 56. Drive unit 58 includes a drive source, such as a stepper motor, associated interface circuitry, and an associated drive mechanism, such as a gear train or belt/pulley arrangement. Feed roller unit 42 feeds the print media sheet 36 over mid-frame 44 in a sheet feed direction 60, designated as a dot in a circle to indicate that the sheet feed direction is out of the plane of FIG. 3, and over mid-frame 44. Sheet feed direction 60 is commonly referred to as the vertical direction, and sometimes may also be referred to as the Y-direction.

Printhead carrier system 46 includes a printhead carrier 62 for mounting and carrying a tri-color inkjet cartridge 64 and a monochrome inkjet cartridge 66.

Also mounted to printhead carrier 62 is an optical sensor 68. Optical sensor 68 may be monitored by controller 18 to collect sensing data generated by optical sensor 68 relating to a sensed characteristic of an image printed on print media sheet 36, such as a printhead alignment pattern.

Tri-color inkjet cartridge 64 includes a tri-chambered color ink reservoir 70 provided in fluid communication with a tri-color inkjet printhead 72 having three nozzle arrays and associated firing heaters, each of which being associated with a respective ink color for jetting ink drops of the respective color. Thus, tri-color inkjet printhead 72 may be considered to be a combination of three printheads, namely, inkjet printhead 72-1, inkjet printhead 72-2, and inkjet printhead 72-3. In the present embodiment, the tri-chambered color ink reservoir 70 has three individual reservoirs, with each including one of three ink colors, such as cyan (C), magenta (M), and yellow (Y). Those skilled in the art will recognize that the tri-color inkjet cartridge 64 may alternatively be in the form of three individual discrete cartridges, one cartridge for each of C, M, and Y. Also, those skilled in the art will recognize that the colorants used may be one or more colorants other than, or in addition to, the C, M, Y and K colorants described in the exemplary embodiments described herein. In the case of additional colorants, then an additional ink jetting nozzle array will be provided for each additional colorant.

Monochrome inkjet cartridge 66 includes a monochrome ink reservoir 74 in fluid communication with a monochrome inkjet printhead 76. In the present embodiment, monochrome ink reservoir 74 contains a black (K) ink, and monochrome ink reservoir 74 is provided in fluid communication with monochrome inkjet printhead 76, e.g., having a black (K) ink nozzle plate and associated firing heaters, for jetting drops of black (K) ink.

Controller 18 is electrically connected and communicatively coupled to tri-color inkjet printhead 72 and monochrome inkjet printhead 76, and optical sensor 68, via an interface cable 34-3 of communications link 34. Interface cable 34-3 may be, for example, a multiple-wire electrical conductor.

In the embodiment shown in FIG. 3, printhead carrier system 46 further includes a pair of guide members 78, 80, such as guide rods, for guiding printhead carrier 62. Each of guide members 78, 80 includes a respective horizontal axis 78-1, 80-1. Printhead carrier 62 may include guide rod bearings and/or guide surfaces (not shown) for receiving guide members 78, 80. Thus, guide members 78, 80, and in turn horizontal axes 78-1, 80-1, define a bi-directional scanning path 84 for printhead carrier 62. Accordingly, bi-directional scanning path 84 is associated with each of tri-color inkjet printhead 72 (72-1, 72-2, 72-3) of tri-color inkjet cartridge 64, monochrome inkjet printhead 76 of monochrome inkjet cartridge 66, and optical sensor 68.

Printhead carrier system 46 further includes carrier drive 86 that includes a carrier motor 88, a carrier transport belt 90, and a carrier drive attachment device 92. Carrier motor 88 may be, for example, a direct current (DC) motor or a stepper motor. Controller 18 is electrically connected and communicatively coupled to carrier motor 88 via an interface cable 34-4 of communications link 34. Interface cable 34-4 may be, for example, a multiple-wire electrical conductor. Printhead carrier 62 is connected to carrier transport belt 90 via carrier drive attachment device 92. Carrier transport belt 90 is driven by a carrier motor 88 via a carrier pulley 88-1. At the directive of controller 18, printhead carrier 62 is transported in a reciprocating manner along guide members 78, 80, i.e., along bi-directional scanning path 84.

The reciprocation of printhead carrier 62 transports tri-color inkjet printhead 72 and monochrome inkjet printhead 76 across the print media sheet 36 along bi-directional scanning path 84 to define the print zone 54 of inkjet print engine 22. The reciprocation of printhead carrier 62 occurs along bi-directional scanning path 84, and is also commonly referred to as the horizontal direction, and sometimes may also be referred to as the X-direction.

The horizontal bi-directional scanning path 84 includes a left-to-right print direction 94 and a right-to-left print direction 96 along the horizontal (X) axes 78-1, 80-1. As used herein, the term "printing pass" refers to an event of printing using at least one of tri-color inkjet printhead 72 and monochrome inkjet printhead 76 during movement of printhead carrier 62 in one of left-to-right print direction 94 and a right-to-left print direction 96. As used herein, the term "non-printing return pass" refers to a return movement of printhead carrier 62 in one of left-to-right print direction 94 and a right-to-left print direction 96 without ejecting ink from either of tri-color inkjet printhead 72 and monochrome inkjet printhead 76.

Figure 4:
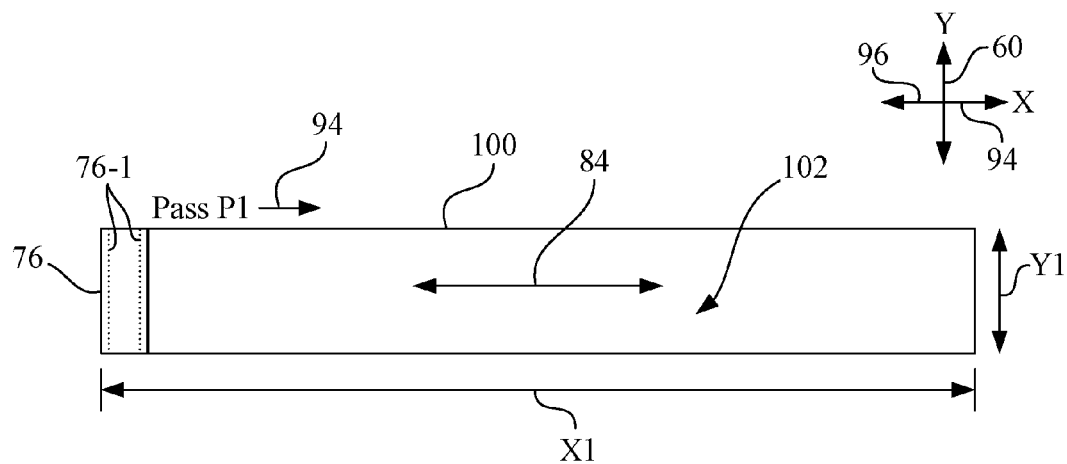
FIG. 4 is a diagrammatic depiction of a print swath having a swath area of dimensions X1×Y1, associated with an ink jetting nozzle array of an inkjet printhead.

Also, as used herein, the term "print swath" is an area having a length dimension corresponding to the horizontal length of the associated printing pass along the horizontal bi-directional scanning path 84 and having a height corresponding to a height of a nozzle array of the associated printhead. For example, as illustrated in FIG. 4, a print swath 100 has a swath area 102 having an X-direction dimension X1 along the horizontal bi-directional scanning path 84 corresponding to the horizontal length of a printing pass, e.g., printing pass P1 in direction 94, and having a Y-direction dimension Y1 associated with a height of an ink jetting nozzle array, such as for example, ink jetting nozzle array 76-1 of monochrome inkjet printhead 76.

Referring again to FIG. 3, sheet feed (e.g., Y) direction 60 is perpendicular to the horizontal bi-directional scanning path 84, and in turn, is perpendicular to the horizontal (X) print directions 94, 96. Thus, with respect to print media sheet 36, carrier reciprocation occurs in a horizontal direction (X) and media advance occurs in an orthogonal, referred to for convenience as a vertical, direction (Y). In other words, carrier reciprocation is perpendicular to the media advance. Typically, during each horizontal pass of printhead carrier 62 in one of horizontal print directions 94, 96 while printing, the print media sheet 36 is held stationary by feed roller unit 42.

During a printing operation, controller 18 executes program instructions to control the reciprocation of printhead carrier 62 in the horizontal (X) print directions 94, 96, to control the operations (e.g., ink ejection, i.e., firing) of tri-color inkjet printhead 72 (72-1, 72-2, 72-3) and monochrome inkjet printhead 76, and to select an index feed distance of print media sheet 36 along the print media path as conveyed by feed roller 56 in the vertical (Y) direction 60.

In accordance with the present invention, printing defects associated with dry-time banding and swath contraction are reduced by considering the likelihood of each defect as a function of the density of all colorants used by inkjet print engine 22, and systematically changing how the ink is applied, e.g., on a per printing pass basis, to reduce each particular defect, as more fully described below.

Figure 5:
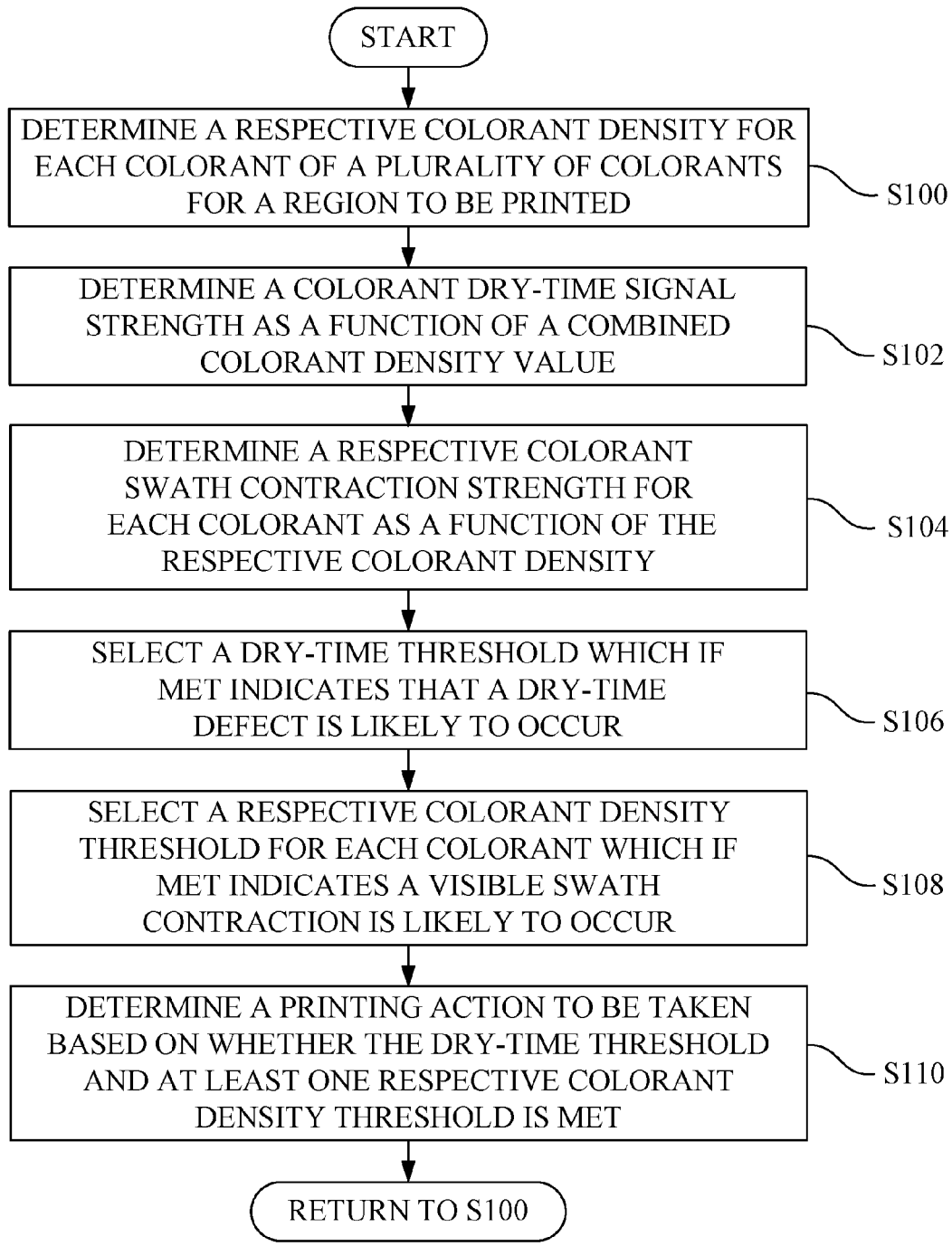
FIG. 5 is a flowchart directed to a method for reducing dry-time and swath contraction printing defects in inkjet printing.

FIG. 5 is a flowchart directed to a method for reducing dry-time and swath contraction printing defects in inkjet printing, in accordance with the present invention. The method steps set forth in FIG. 5 may be implemented as a sequence of program instructions to be executed by controller 18.

At step S100, a respective colorant density for each colorant of a plurality of colorants for a region to be printed is determined.

For example, each of a cyan (C) ink drop density, a magenta (M) ink drop density, a yellow (Y) ink drop density, and a black (K) ink drop density may be determined for the region to be printed. In the present embodiment, this determination is performed based on an analysis of the image data associated with the region to be printed, i.e., prospectively, prior to printing a print swath associated with the image data, and may be represented as a percentage of the region coverage. In particular, controller 18 executes program instructions to process the image data associated with the region to be printed and to determine for each colorant a percent coverage in the region.

In one scenario, the respective ink drop density for each colorant is a raster line density one inkjet nozzle in height along a predetermined length. This predetermined length may be a number of print locations available along a length of the print swath associated with the image data. For example, if a raster line has 2400 print positions along the length of the print swath and the image data associated with the black (K) nozzle of nozzle array 76-1 of inkjet printhead 76 indicates that the black (K) nozzle is to be activated 1200 times along that raster line, then the black (K) ink drop density is 50 percent.

However, because of the limited sampling of a printed page based on a single raster line, it likely will be more desirable to determine the respective ink drop density for each colorant as an area density having a height dimension and a length dimension, such as by using multiple raster lines of the print swath as the height dimension, or a full height of a nozzle array along the length of the print swath, as illustrated in FIG. 4. Further, the area density may be a sub-portion of the area of the print swath associated with the image data, and may be represented in units of pixels, with each pixel corresponding to one actuation of an ink jetting nozzle of a respective colorant, and then converted to a percentage. For example, if a sample density area is 300× 300 pixels, and the image data for magenta (M) indicates that the magenta (M) nozzle array of inkjet printhead 72-2 is to be activated 900 times in the 300×300 sample density area, then the magenta (M) ink drop density is 10 percent.

Further, it is contemplated that at least one of the cyan (C) ink drop density, the magenta (M) ink drop density, the yellow (Y) ink drop density, and the black (K) ink drop density may be subjected to a weighting coefficient, i.e., a multiplier. For example, if the base yellow (Y) ink drop density is 10 percent and has a weighting factor of 2, then the value used as the yellow (Y) ink drop density is 20 percent.

At step S102, a colorant dry-time signal strength is determined as a function of a combined colorant density value. The combined colorant density value is based on the respective colorant densities of the plurality of colorants for the region to be printed. In the present embodiment, controller 18 executes program instructions to analyze the image data for a region to be printed to determine, as a percentage of the area of the region, the density of each colorant for the region, and then combines, e.g., sums, the colorant densities to determine, e.g., calculate, the colorant dry-time signal strength.

For example, a colorant dry-time signal strength may be determined as a function of a combined CMYK colorant density value. The combined CMYK colorant density value is based on a combination, e.g., sum, of the cyan (C) ink drop density, the magenta (M) ink drop density, the yellow (Y) ink drop density, and the black (K) ink drop density. For example, if the image data indicates that within the region to be printed there is 10 percent area coverage of each of the colorants C, M, Y, and K, then the combined colorant density value may be, for example, 40 percent.

Alternatively, a CMY colorant dry-time signal strength for CMY may be determined separate from a K colorant dry-time signal strength for black (K), using the technique described above.

At step S104, a respective colorant swath contraction strength is determined for each colorant as a function of the respective colorant density.

For example, a cyan (C) swath contraction strength is determined as a function of the cyan (C) ink drop density; a magenta (M) swath contraction strength is determined as a function of the magenta (M) ink drop density; a yellow (Y) swath contraction strength is determined as a function of the yellow (Y) ink drop density; and a black (K) swath contraction strength is determined as a function of the black (K) ink drop density. Each respective colorant swath contraction strength may be in direct correspondence to the respective colorant ink drop density. For example, if the cyan (C) ink drop density is 10 percent, then the cyan (C) swath contraction strength is 10 percent; if the magenta (M) ink drop density magenta (M) is 20 percent, then the magenta (M) swath contraction strength is 20 percent. Alternatively, however, if desired, one or more weighting factors may be used to magnify the respective colorant ink drop density, such as if the yellow (Y) ink drop density is 10 percent, and has a weighting factor of 2, then the yellow (Y) swath contraction strength is 20 percent. Likewise, if the black (K) ink drop density is 12 percent, and has a weighting factor of 3, then the black (K) swath contraction strength is 36 percent.

At step S106, a dry-time threshold is selected, which if met by the colorant dry-time signal strength indicates that a dry-time defect is likely to occur.

As used here, terms referencing that a threshold is "met" by a condition, or that a condition "meets" a threshold, means that a value associated with the condition either reaches or exceeds the threshold value, i.e., is equal to (=), or is greater than or equal to (≥), the threshold.

For example, a CMYK dry-time threshold may be selected, which if met by the combined CMYK colorant density value, indicates that a dry-time defect is likely to occur.

Such a dry-time threshold may be determined empirically, and stored in memory circuit 26, for a given inkjet printer model and/or for a given printing mode. For example, a specific dry-time threshold may be determined for each of a plurality of printing modes, e.g., draft, normal, best, photo, etc., and stored in memory circuit 26. In the present embodiment, controller 18 executes program instructions to select a dry-time threshold from one or more previously determined dry-time threshold values stored in memory circuit 26.

At step S108, a respective colorant density threshold is selected for each colorant, which if met by the respective colorant density indicates a visible swath contraction is likely to occur.

For example, a cyan (C) density threshold is selected representing a cyan (C) ink drop density amount, which if met indicates that a visible swath contraction is likely to occur; a magenta (M) density threshold is selected representing a magenta (M) ink drop density amount, which if met indicates that a visible swath contraction is likely to occur; a yellow (Y) density threshold is selected representing a yellow (Y) ink drop density amount, which if met indicates that a visible swath contraction is likely to occur; and a black (K) density threshold is selected representing a black (K) ink drop density amount, which if met indicates that a visible swath contraction is likely to occur.

Such colorant density thresholds may be determined empirically, and stored in memory circuit 26, for a given inkjet printer model and/or for a given printing mode. For example, specific colorant density thresholds may be determined for each of a plurality of printing modes, e.g., draft, normal, best, photo, etc., and stored in memory circuit 26. In the present embodiment, controller 18 executes program instructions to select colorant density thresholds from previously determined colorant density threshold values stored in memory circuit 26.

At step S110, a printing action to be taken is determined based on whether the dry-time threshold is met and whether at least one respective colorant density threshold is met.

For example, if the dry-time signal strength meets the dry-time threshold, then tentatively, a CMY printing pass is performed in a first direction, followed by a non-printing return pass in a second direction opposite to the first direction, followed by a K printing pass in the first direction. However, if the black (K) swath contraction strength meets the black (K) density threshold, then the K printing pass may be split into a first K printing pass in the first direction and a second K printing pass in the first (same) direction with a non-printing return pass between the first K printing pass and the second K printing pass.

Further, if the cyan (C) swath contraction strength meets the cyan (C) density threshold, or if the magenta (M) swath contraction strength meets the magenta (M) density threshold, or if the yellow (Y) swath contraction strength meets the yellow (Y) density threshold, then the CMY printing pass is split into a first CMY printing pass in the first direction and a second CMY printing pass in the first (same) direction with a non-printing return pass in the opposite direction between the first CMY printing pass and the second CMY printing pass.

Figure 6:
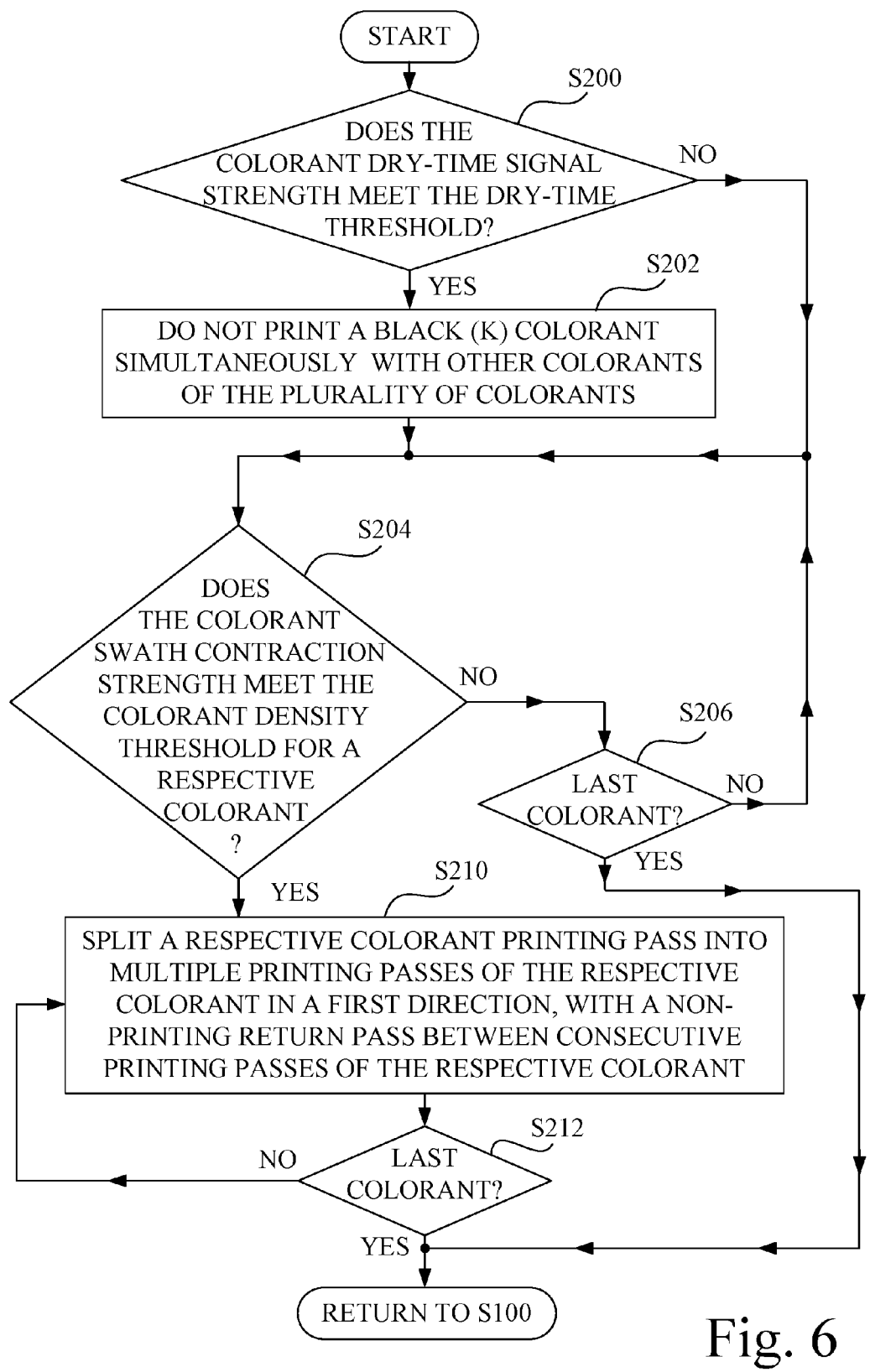
FIG. 6 is a flowchart of a more detailed subroutine for implementing the act of determining a printing action to be taken of the flowchart of FIG. 5.

A more detailed subroutine for implementing step S110 is described in the flowchart of FIG. 6. The method steps set forth in FIG. 6 may be implemented as a sequence of program instructions to be executed by controller 18.

At step S200, it is determined whether the colorant dry-time signal strength meets the dry-time threshold.

If the determination is NO, i.e., the colorant dry-time signal strength does not meet the dry-time threshold, then the process proceeds to step S204.

If the determination is YES, i.e., the colorant dry-time signal strength meets the dry-time threshold, then a printing decision is made to not print a black (K) colorant simultaneously with other colorants of the plurality of colorants. This action may be realized, for example, by printing non-black colorants on a non-black colorant printing pass in one print direction, e.g., left-to-right print direction 94, followed by a non-printing return pass in an opposite direction, e.g., right-to-left print direction 96, followed by a black (K) printing pass in the same direction as the previous non-black colorant printing pass, e.g., left-to-right print direction 94.

At step S204, it is determined whether a respective colorant swath contraction strength for a respective colorant (e.g., one of colorants C, M, Y, and K) meets the respective colorant density threshold for the respective colorant.

If the determination at step S204 is NO, i.e., a respective colorant swath contraction strength for a respective colorant does not meet the respective colorant density threshold for the respective colorant, then the process proceeds to step S206.

At step S206, it is determined whether the colorant swath contraction strength of the last colorant of the group of colorants (e.g., C, M, Y, K) has been processed through step S204. If the determination at step S206 is NO, then the process returns to step S204 to process the next colorant density contraction strength for the next colorant.

However, at step S206, if the result was YES, then the process returns to step S100 of the main routine of FIG. 5.

If the determination at step S204 is YES, i.e., a respective colorant swath contraction strength for a respective colorant meets the respective colorant density threshold for the respective colorant, then the process proceeds to step S210.

At step S210, a respective colorant printing pass is split into a first respective colorant printing pass in a printing direction, e.g., left-to-right print direction 94, a second respective colorant printing pass in the printing direction, e.g., left-to-right print direction 94, and with a non-printing return pass, e.g., in right-to-left print direction 96, between the first respective colorant printing pass and the second respective colorant printing pass. This consideration may be realized, for example, by providing shingled respective colorant printing in multiple respective colorant printing passes with a non-printing return pass between consecutive pairs of respective colorant printing passes.

More particularly, for example, if a respective colorant swath contraction strength for a black (K) colorant meets the respective colorant density threshold for the black (K) colorant, then the black (K) printing pass will be split into a first K printing pass in the printing direction, e.g., left-to-right print direction 94, a second K printing pass in the printing direction, e.g., left-to-right print direction 94, and with a non-printing return pass, e.g., in right-to-left print direction 96, between the first K printing pass and the second K printing pass. This consideration may be realized, for example, by providing shingled black (K) printing in multiple black (K) printing passes with a non-printing return pass between consecutive pairs of black (K) printing passes.

At step S212, step S210 is repeated for each colorant represented in the image data of the present region to be printed that is under consideration. As soon as step S210 has been repeated for all colorants, then all corrective actions regarding dry-time defects and swath contraction defects for the present region to be printed that is under consideration have been made, and the process returns to step S100 to repeat the process for the image data of the next region to be printed.

Those skilled in the art will recognize that steps S106 and S108 need not be repeated, unless it is desired to do so. In other words, once each of the dry-time threshold and the respective colorant density thresholds are established at steps S106 and S108, those dry-time threshold and the respective colorant density thresholds may be used for the entirety of the current print job. However, in some instances, it may be desirable to change the dry-time threshold and respective colorant density thresholds within a print job, or within a page of a print job. For example, if the image data has a region of a predominant color, or if there is a combination of text and picture data, then it may be desirable to select a different dry-time threshold and respective colorant density thresholds for each of the respective regions of the page.

Figure 7:
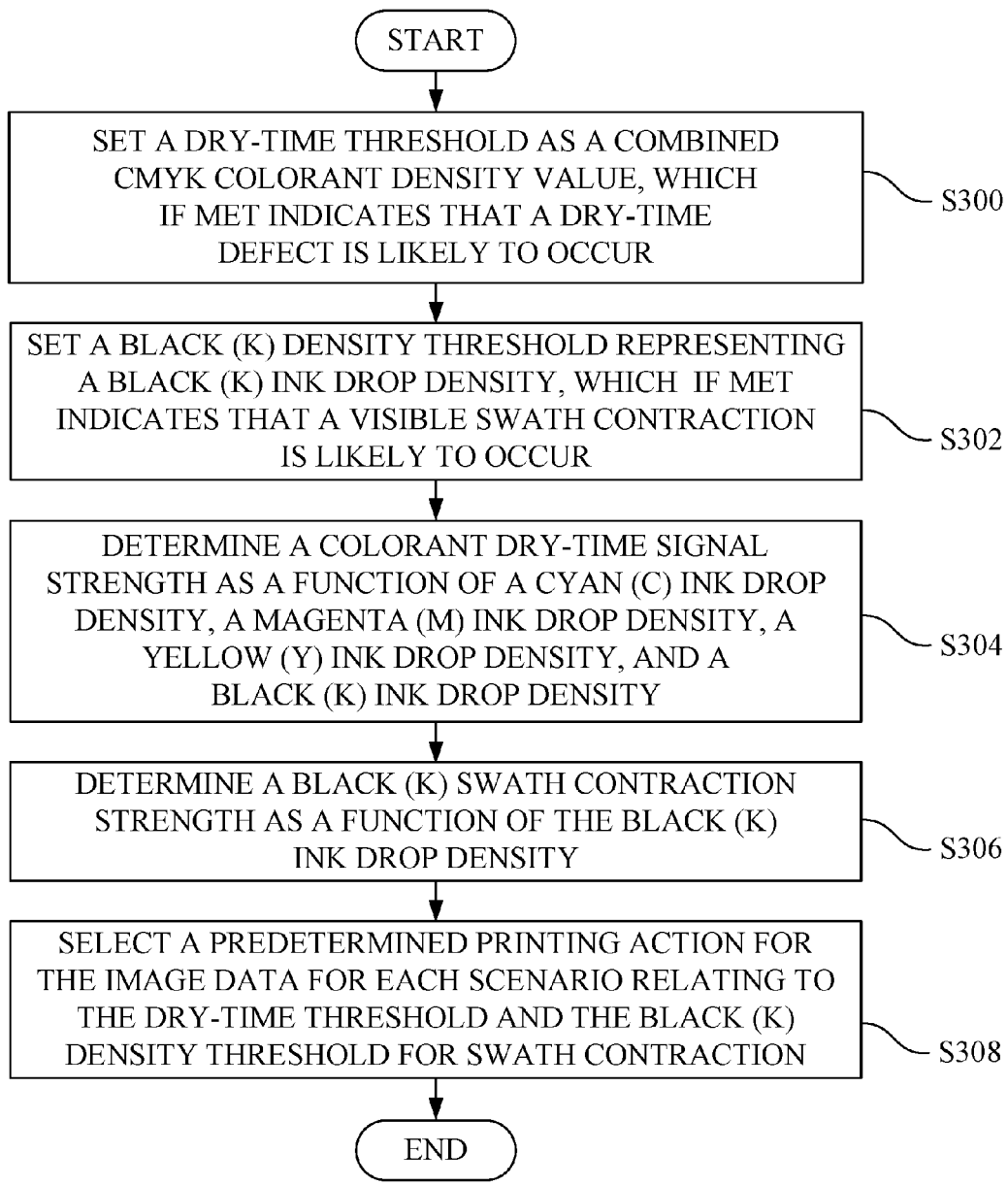
FIG. 7 is a flowchart directed to another method for reducing dry-time and swath contraction printing defects in inkjet printing.

FIG. 7 is a variation of the method of FIG. 5, and also is directed to a method for reducing dry-time and swath contraction printing defects in inkjet printing, in accordance with the present invention. The method steps set forth in FIG. 7 may be implemented as a sequence of program instructions to be executed by controller 18.

At step S300, a dry-time threshold is set. In the present example, the dry-time threshold is a combined CMYK colorant density value, which if met indicates that a dry-time effect is likely to occur.

Such dry-time threshold may be determined empirically, and stored in memory circuit 26, for a given inkjet printer model and/or for a given printing mode. For example, a specific dry-time threshold may be determined for each of a plurality of printing modes, e.g., draft, normal, best, photo, etc., and stored in memory circuit 26. In the present embodiment, controller 18 executes program instructions to select a dry-time threshold from one or more previously determined dry-time threshold values stored in memory circuit 26.

At step S302, a black (K) density threshold is set. In the present embodiment, the black (K) density threshold represents a black (K) ink drop density value, which if met indicates that a visible swath contraction is likely to occur.

The black (K) density threshold may be determined empirically, and stored in memory circuit 26, for a given inkjet printer model and/or for a given printing mode. For example, a specific black (K) density threshold may be determined for each of a plurality of printing modes, e.g., draft, normal, best, photo, etc., and stored in memory circuit 26. In the present embodiment, controller 18 executes program instructions to select a black (K) density threshold from previously determined black (K) density threshold values stored in memory circuit 26.

At step S304, a colorant dry-time signal strength is determined as a function of a cyan (C) ink drop density, a magenta (M) ink drop density, a yellow (Y) ink drop density, and a black (K) ink drop density. Each ink drop density for a respective colorant C, M, Y, and K, is based on image data for a print swath to be printed.

In the present embodiment, controller 18 executes program instructions to analyze the image data for a region to be printed to determine, as a percentage of the area of the region, the density of each colorant for the region, and then combines, e.g., sums, the colorant densities to determine the colorant dry-time signal strength.

At step S306, a black (K) swath contraction strength is determined as a function of the black (K) ink drop density. In the present embodiment, controller 18 executes program instructions to analyze the image data for a region to be printed to determine, as a percentage of the area of the region, the black (K) ink drop density for the region, and then uses the black (K) ink drop density as the black (K) swath contraction strength.

At step S308, a predetermined printing action for the image data is selected for each of four possible scenarios, i.e., combinations, (00, 01, 10, 11) of colorant dry-time signal strength and black (K) swath contraction strength relating to the dry-time threshold and the black (K) density threshold for swath contraction.

Scenario 00: If the dry-time signal strength does not meet the dry-time threshold, and the black (K) swath contraction strength does not meet the black (K) density threshold, then perform CMY shingled printing having a CMY printing pass in a first direction, followed by a CMY printing pass in a second direction opposite to the first direction, followed by a CMY printing pass in the first direction, and followed by a CMYK printing pass in the second direction.

As used herein, the term "shingled printing" (sometimes also referred to in the art as interlaced printing, or "shingling") is a multi-pass printing technique wherein image data for a given print region, e.g., a given print line (i.e., raster) or given print area, is divided (or masked), such that the dot locations of the print region are printed in an interlaced pattern (e.g., a checkerboard pattern), wherein only a portion of the ink dot locations are printed in a particular printing pass. For example, in two pass printing (50 percent shingling), approximately 50 percent of the dots necessary to print the print region are placed on a first printing pass of the printhead and the remaining 50 percent of the dots necessary to print the print region are placed on a subsequent printing pass.

Scenario 01: If the dry-time signal strength does not meet the dry-time threshold, and the black (K) swath contraction strength meets the black (K) density threshold, then perform CMY, CMYK, and K shingled printing comprising a CMY printing pass in a first direction, followed by a CMY printing pass in a second direction opposite to the first direction, followed by a CMY printing pass in the first direction, and followed by a CMYK printing pass in the second direction, followed by a non-printing return pass in the first direction, followed by a K printing pass in the second direction.

Scenario 10: If the dry-time signal strength meets the dry-time threshold, and the black (K) swath contraction strength does not meet the black (K) density threshold, then perform CMY shingled printing comprising a CMY printing pass in a first direction, followed by a CMY printing pass in a second direction opposite to the first direction, followed by a CMY printing pass in the first direction, followed by a CMY printing pass in the second direction, followed by a non-printing return pass in the first direction, followed by a K printing pass in the second direction.

Scenario 11: If the dry-time signal strength meets the dry-time threshold, and the black (K) swath contraction strength meets the black (K) density threshold, then perform CMY and K shingled printing comprising a CMY printing pass in a first direction, followed by a CMY printing pass in a second direction opposite to the first direction, followed by a CMY printing pass in the first direction, followed by a CMY printing pass in the second direction, followed by a non-printing return pass in the first direction, followed by a K printing pass in the second direction, followed by a non-printing return pass in the first direction, followed by a K printing pass in the second direction.

Figure 8:
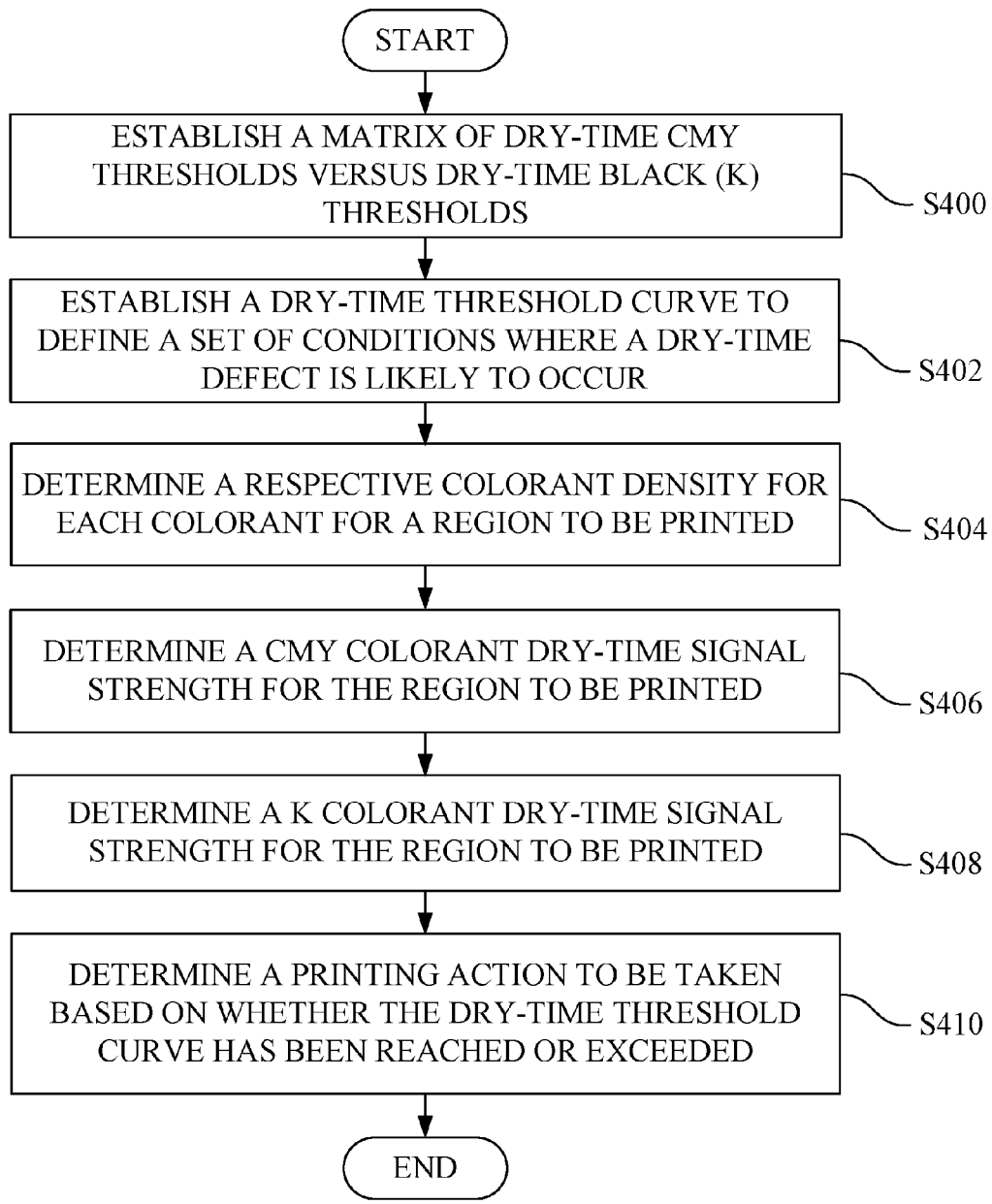
FIG. 8 is a flowchart of a method for reducing dry-time printing defects that utilizes a dry-time threshold curve to define a plurality of conditions where a dry-time defect is likely to occur.

FIG. 8 is a flowchart of another method for reducing dry-time printing defects, which may be used alone or in conjunction with the swath contraction defect considerations described above in discussing the methods depicted in the flowcharts of FIGS. 5-7. The method steps set forth in FIG. 8 may be implemented as a sequence of program instructions to be executed by controller 18.

At step S400, a matrix of a plurality of dry-time CMY thresholds versus a plurality of dry-time black (K) thresholds is established.

Such dry-time thresholds may be determined empirically, and stored in memory circuit 26, for a given inkjet printer model and/or for a given printing mode. For example, specific dry-time thresholds may be determined for each of a plurality of printing modes, e.g., draft, normal, best, photo, etc., and stored in memory circuit 26. In the present embodiment, controller 18 executes program instructions to establish the matrix of the plurality of dry-time CMY thresholds versus the plurality of dry-time black (K) thresholds from previously determined dry-time threshold values stored in memory circuit 26.

Figure 9:
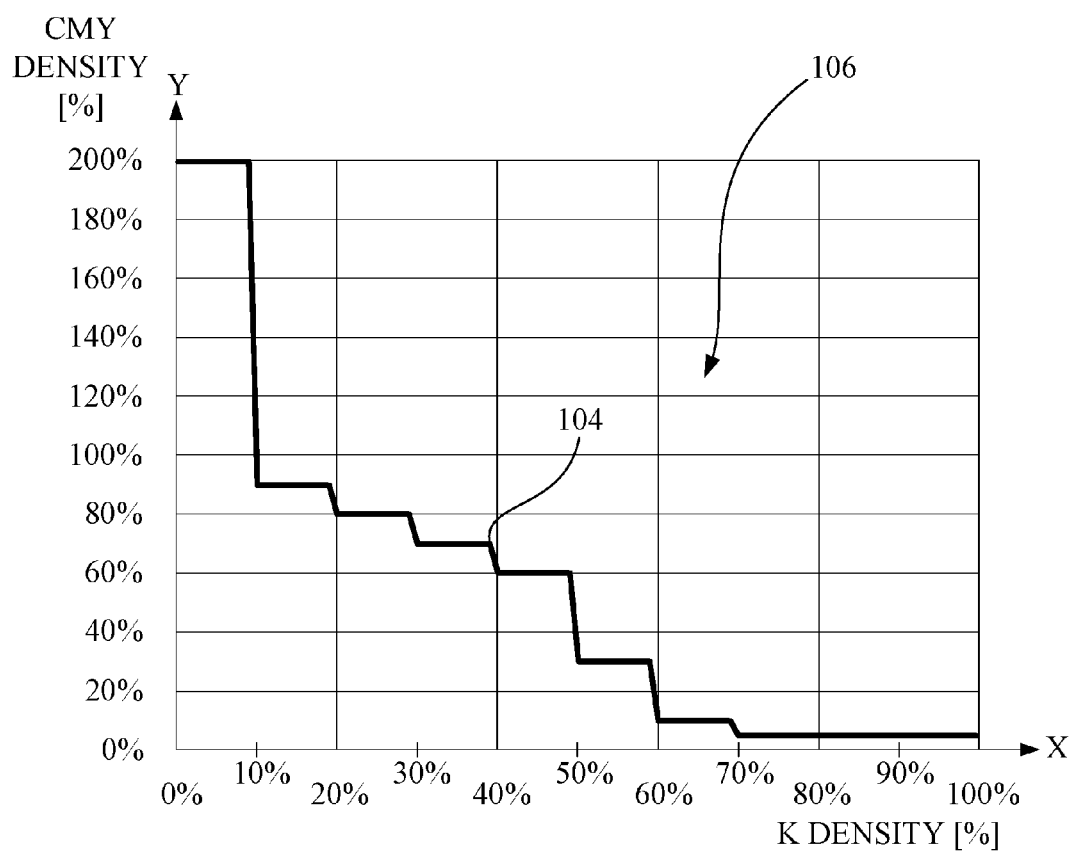
FIG. 9 is a graph showing a threshold matrix and the dry-time threshold curve, in accordance with the method represented by the flowchart of FIG. 8.

Referring to FIG. 9, the plurality of dry-time CMY density thresholds in 20 percent increments is established on the Y-axis of the graph, and the plurality of dry-time black (K) density thresholds in 10 percent increments is established on the X axis of the graph. CMY percentages above 100 percent are used to account for double pass printing of CMY colorants.

At step S402, a dry-time threshold curve 104 is established to define a set of conditions where a dry-time defect is likely to occur. In the graphical depiction set forth in FIG. 9, a dry-time defect is likely to occur if a combination of the CMY colorant dry-time signal strength and the K colorant dry-time signal strength reaches or exceeds the dry-time threshold curve 104, i.e., a plot of the CMY colorant dry-time signal strength value versus the K colorant dry-time signal strength value lies in the dry-time defect region 106 located at or to the right of the dry-time threshold curve 104 in the X-direction and at or above the dry-time threshold curve 104 in the Y-direction.

At step S404, a respective colorant density for each colorant of a plurality of colorants for a region to be printed is determined.

For example, each of a cyan (C) ink drop density, a magenta (M) ink drop density, a yellow (Y) ink drop density, and a black (K) ink drop density may be determined for the region to be printed, using techniques described above, such as based on an analysis of the image data associated with the region to be printed prior to printing a print swath associated with the image data.

At step S406, a CMY colorant dry-time signal strength is determined as a function of a combined CMY colorant density value based on the CMY colorant density for the region to be printed.

For example, the CMY colorant dry-time signal strength may be based on a sum of the cyan (C) ink drop density, the magenta (M) ink drop density, and the yellow (Y) ink drop density. For example, if the image data indicates that within the region to be printed there is a 10 percent area coverage of each of the colorants CMY, then the combined colorant density value may be, for example, 30 percent.

At step S408, a K colorant dry-time signal strength is determined as a function of a K colorant density value based for the region to be printed. For example, the K colorant dry-time signal strength may be set to be equal to the black (K) ink drop density.

At step S410, a printing action to be taken is determined based on whether the dry-time threshold curve 104 has been reached or exceeded by the CMY colorant dry-time signal strength plotted against the K colorant dry-time signal strength.

For example, at step S410, if the dry-time threshold curve 104 has not been reached, then no corrective action for dry-time defects is needed, and the normal printing routine associated with the current print mode proceeds without modification, or alternatively, one of the swath contraction defect considerations discussed above may be invoked. Referring to FIG. 9, an example of where the dry-time threshold curve 104 has not been reached is a combination a CMY colorant dry-time signal strength value of 80 percent versus a K colorant dry-time signal strength value of 17 percent.

However, at step S410, if the dry-time threshold curve 104 has been reached or exceeded, then a dry-time defect reduction printing method is invoked. For example, non-black colorants will be printed on a non-black CMY colorant printing pass in a first direction, followed by a non-printing return pass in an opposite direction, followed by a black (K) printing pass in the first direction. If it is desired that swath contraction defect considerations also be made, then a further determination of whether to further split, e.g., shingle, one or both of the CMY colorant printing pass and the black (K) printing pass into multiple CMY colorant printing passes and/or multiple black (K) printing passes can be made based on the criteria described above in discussing the methods depicted in the flowcharts of FIGS. 5-7.

Referring to FIG. 9, an example of where the dry-time threshold curve 104 has been reached is a combination a CMY colorant dry-time signal strength value of 80 percent versus a K colorant dry-time signal strength value equal to or greater than (≥) 20 percent.

The method represented by the flowchart of FIG. 8 may be repeated for the image data associated with each region to be printed. Those skilled in the art will recognize that the steps S400 and S402, once established, need not be repeated, unless it is desired to do so. For example, steps S400 and S402 may be repeated to establish a respective dry-time threshold curve for each of a plurality of printing modes, e.g., draft, high quality, photo, etc.

While this invention has been described with respect to at least one embodiment, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for reducing printing defects in inkjet printing, comprising:
    determining a respective colorant density for each colorant of a plurality of colorants for a region to be printed;
    determining a colorant dry-time signal strength as a function of a combined colorant density value based on the respective colorant densities of the plurality of colorants for the region to be printed;
    determining a respective colorant swath contraction strength for each colorant as a function of the respective colorant density;
    selecting a dry-time threshold which if met by the colorant dry-time signal strength indicates a dry-time defect;
    selecting a respective colorant density threshold for each colorant which if met by the respective colorant density indicates a visible swath contraction; and
    determining a printing action to be taken based on whether the dry-time threshold is met and whether at least one respective colorant density threshold is met.

2. The method of claim 1, wherein if the colorant dry-time signal strength meets the dry-time threshold, then do not print a black (K) colorant simultaneously with other colorants of the plurality of colorants.

3. The method of claim 1, wherein if the colorant dry-time signal strength meets the dry-time threshold, then print non-black colorants on a non-black colorant printing pass in a direction, followed by a non-printing return pass in an opposite direction, followed by a black (K) printing pass in the direction.

4. The method of claim 1, wherein if the respective colorant swath contraction strength for a black (K) colorant meets the respective colorant density threshold for the black (K) colorant, then split a K printing pass into a first K printing pass in a direction, a second K printing pass in the direction, and with a non-printing return pass in an opposite direction between the first K printing pass and the second K printing pass.

5. The method of claim 1, wherein if the respective colorant swath contraction strength for a black (K) colorant meets the respective colorant density threshold for the black (K) colorant, then provide shingled K printing in multiple K printing passes with a non-printing return pass between consecutive pairs of K printing passes.

6. The method of claim 1, wherein if the respective colorant swath contraction strength for a respective colorant meets the respective colorant density threshold for the respective colorant, then split a respective colorant printing pass into a first respective colorant printing pass in a direction, a second respective colorant printing pass in the direction, and with a non-printing return pass between the first respective colorant printing pass and the second respective colorant printing pass.

7. The method of claim 1, wherein if the respective colorant swath contraction strength for a respective colorant meets the respective colorant density threshold for the respective colorant, then provide shingled respective colorant printing in multiple respective colorant printing passes.

8. A method for reducing printing defects in inkjet printing, comprising:
    setting a dry-time threshold as a combined CMYK colorant density value, which if met indicates a dry-time defect;
    setting a black (K) density threshold representing a black (K) ink drop density, which if met indicates a visible swath contraction;
    determining a colorant dry-time signal strength as a function of a cyan (C) ink drop density, a magenta (M) ink drop density, a yellow (Y) ink drop density, and a black (K) ink drop density, wherein each ink drop density for a respective colorant is based on image data for a print swath to be printed;
    determining a black (K) swath contraction strength as a function of the black (K) ink drop density; and
    selecting a predetermined printing action for the image data for each of four possible scenarios of colorant dry-time signal strength and black (K) swath contraction strength relating to the dry-time threshold and the black (K) density threshold.

9. The method of claim 8, wherein if the dry-time signal strength does not meet the dry-time threshold, and the black (K) swath contraction strength does not meet the black (K) density threshold, then perform CMY shingled printing comprising a CMY printing pass in a first direction, followed by a CMY printing pass in a second direction opposite to the first direction, followed by a CMY printing pass in the first direction, and followed by a CMYK printing pass in the second direction.

10. The method of claim 8, wherein if the dry-time signal strength does not meet the dry-time threshold, and the black (K) swath contraction strength meets the black (K) density threshold, then perform shingled printing comprising a CMY printing pass in a first direction, followed by a CMY printing pass in a second direction opposite to the first direction, followed by a CMY printing pass in the first direction, and followed by a CMYK printing pass in the second direction, followed by a non-printing return pass in the first direction, followed by a K printing pass in the second direction.

11. The method of claim 8, wherein if the dry-time signal strength meets the dry-time threshold, and the black (K) swath contraction strength does not meet the black (K) density threshold, then perform CMY shingled printing comprising a CMY printing pass in a first direction, followed by a CMY printing pass in a second direction opposite to the first direction, followed by a CMY printing pass in the first direction, followed by a CMY printing pass in the second direction, followed by a non-printing return pass in the first direction, followed by a K printing pass in the second direction.

12. The method of claim 8, wherein if the dry-time signal strength meets the dry-time threshold, and the black (K) swath contraction strength meets the black (K) density threshold, then perform shingled printing comprising a CMY printing pass in a first direction, followed by a CMY printing pass in a second direction opposite to the first direction, followed by a CMY printing pass in the first direction, and followed by a CMY printing pass in the second direction, followed by a non-printing return pass in the first direction, followed by a K printing pass in the second direction, followed by a non-printing return pass in the first direction, followed by a K printing pass in the second direction.

13. A method for reducing printing defects in inkjet printing, comprising:

determining a cyan (C) ink drop density for a region to be printed;

determining a magenta (M) ink drop density for the region to be printed;

determining a yellow (Y) ink drop density for the region to be printed;

determining a black (K) ink drop density for the region to be printed;

determining a colorant dry-time signal strength as a function of the cyan (C) ink drop density, the magenta (M) ink drop density, the yellow (Y) ink drop density, and the black (K) ink drop density;

setting a dry-time threshold as a combined CMYK colorant density value;

determining a cyan (C) swath contraction strength as a function of the cyan (C) ink drop density;

determining a magenta (M) swath contraction strength as a function of the magenta (M) ink drop density;

determining a yellow (Y) swath contraction strength as a function of the yellow (Y) ink drop density;

determining a black (K) swath contraction strength as a function of the black (K) ink drop density;

setting a cyan (C) density threshold representing a cyan (C) ink drop density;

setting a magenta (M) density threshold representing a magenta (M) ink drop density;

setting a yellow (Y) density threshold representing a yellow (Y) ink drop density;

setting a black (K) density threshold representing a black (K) ink drop density;

if the colorant dry-time signal strength meets the dry-time threshold, then tentatively perform a CMY printing pass in a first direction, followed by a non-printing return pass in a second direction opposite to the first direction, followed by a K printing pass in the first direction;

if the black (K) swath contraction strength meets the black (K) density threshold, then splitting the K printing pass into a first K printing pass in the first direction and a second K printing pass in the first direction with a non-printing return pass between the first K printing pass and the second K printing pass; and if the cyan (C) swath contraction strength meets the cyan (C) density threshold, or if the magenta (M) swath contraction strength meets the magenta (M) density threshold, or if the yellow (Y) swath contraction strength meets the yellow (Y) density threshold, then splitting the CMY printing pass into a first CMY printing pass in the first direction and a second CMY printing pass in the first direction with a non-printing return pass between the first CMY printing pass and the second CMY printing pass.

14. The method of claim 13, wherein a respective ink drop density for each colorant is determined by analyzing image data prior to printing a print swath associated with the image data.

15. The method of claim 14, wherein the respective ink drop density for each colorant is a raster line density one inkjet nozzle in height along a predetermined length.

16. The method of claim 15, wherein the predetermined length is a number of print locations available along a length of the print swath associated with the image data.

17. The method of claim 14, wherein the respective ink drop density for each colorant is an area density having a height dimension and a length dimension.

18. The method of claim 17, wherein each of the height dimension and the length dimension is in the unit of pixels, with each pixel corresponding to one inkjet nozzle of a respective colorant.

19. The method of claim 17, wherein the height dimension is a number of rasters and the length dimension is a number of print locations available along a length of the print swath associated with the image data.

20. The method of claim 13, wherein at least one of the cyan (C) ink drop density, the magenta (M) ink drop density, the yellow (Y) ink drop density, and the black (K) ink drop density has a weighting coefficient.

* * * * *